Patented Nov. 24, 1931

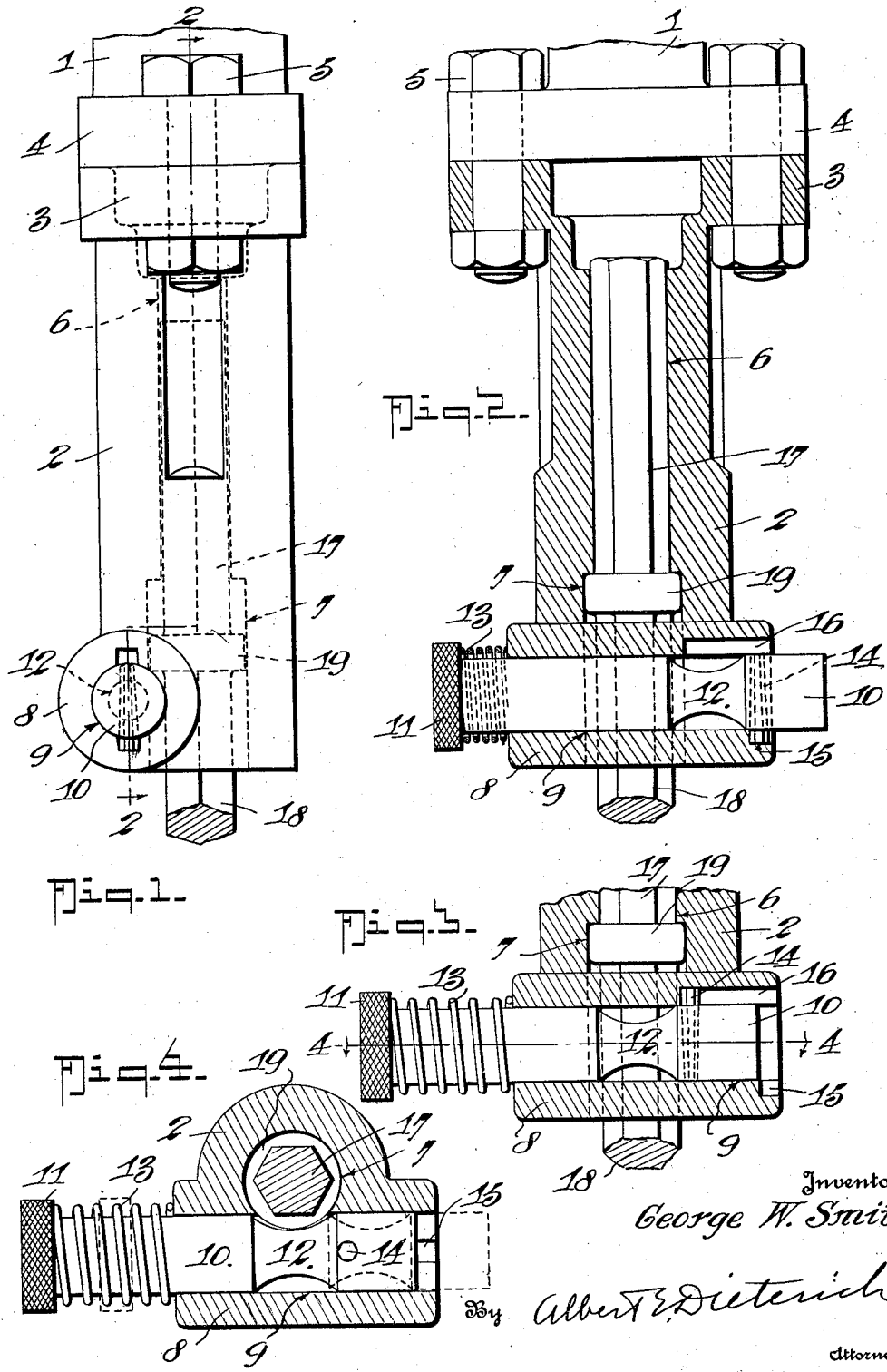

1,833,236

UNITED STATES PATENT OFFICE

GEORGE W. SMITH, OF OTTUMWA, IOWA, ASSIGNOR TO HARDSOCG WONDER DRILL CO., OF OTTUMWA, IOWA, A CORPORATION

TOOL RETAINER

Application filed May 15, 1931. Serial No. 537,678.

My invention relates to rock drills, pavement breakers and the like and it particularly relates to the means for retaining the tool on the drill engine.

Primarily, the invention has for an object to provide a tool retainer of a very simple yet rugged construction, that may be easily manipulated to secure or release the drill from the chuck.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figure 1 is a side elevation of my tool retainer, the lower end of a drill engine being shown for purposes of illustrating manner of attaching the same.

Figure 2 is a vertical longitudinal section of the tool chuck and retainer taken on the line 2—2 of Figure 1, the drill being shown in its raised position.

Figure 3 is a detail vertical section of the lower end of the chuck showing the tool retaining device in its drill releasing position.

Figure 4 is a horizontal section taken on the line 4—4 of Figure 3.

In the drawings in which like numerals of reference indicate like parts in all of the figures, 1 represents the drill and 2 the chuck thereof. The chuck has ears 3 to connect with similar ears 4 on the drilling engine to which it is secured by suitable cushion bolts 5. 6 represents the socket for the shank of the drill steel and 7 represents the counterbore in which the collar of the drill steel is adapted to lie.

The chuck has a transverse enlargement 8 provided with a transverse bore 9 for the locking bolt 10, the bore 9 intersecting the collar bore recess 7.

The locking bolt is longer than the enlargement and has an end projecting to carry a milled head 11 and a coil spring 13 for tending to move the locking bolt continuous in one direction. The locking bolt has an annular concave groove 12 which, when the bolt is in one position, enables the collar 19 of the drill steel to clear the bolt for the purpose of removing the tool from the chuck, but when the bolt is in another position the groove 12 will be out of alignment with the collar 19 and the bolt 10 will thus lock the drill within the chuck, it being understood that the depth of the bore 7 is such that the drill steel 17 may move slightly in a longitudinal direction.

The enlargement 8 at the end opposite the head of the bolt is provided with a shallow groove 15 and a deep groove 16, in either one of which the cross pin 14 that is carried by the bolt 10 may lie and be held by virtue of the tension of the spring 13. When the bolt is pushed in and turned to bring the pin 14 in the shallow groove 15, in the embodiment of the invention illustrated, the annular concave groove 12 will be out of alignment with the collar 19 and the bolt 10 will hold the tool in place. To release the tool one simply pushes against the head 11 of the bolt to clear the pin 14 from the groove 15 and gives the bolt a half turn, thus enabling the pin 14 to enter the deep groove 16 and allow the spring 13 to move the bolt 10 to the position where the groove 12 will align with the collar 19 and thus free the tool from the chuck.

In the embodiment of the invention illustrated, the drill steel is hexagonal in cross section so that its shank 18, when in the socket 16, will prevent rotation of the drill on its axis.

From the foregoing description, taken in connection with the accompanying drawings, it is thought the complete construction, operation and advantages of my invention will be clear to those skilled in the art to which it relates.

What I claim is:

1. In drill retainers, a chuck having a longitudinal hole for the drill steel shank and having a counterbore for receiving the drill steel collar, said chuck having a transverse enlargement with a cross bore intersecting said collar receiving bore, and a latch bolt in said transverse enlargement's bore, said bolt projecting beyond the limits of said transverse enlargement's bore and having a head on one end, means continuously tending to move said bolt in one direction, said enlargement having a shallow groove and a deep groove intersecting said cross bore, a bolt holding pin projecting from one side of said bolt to lie in either of said grooves to hold said bolt in one position or another, said bolt having an annular groove to clear the drill steel collar when said bolt is in one of its said positions.

2. In drill retainers, a chuck having a longitudinal hole for the drill steel shank and having a counterbore for receiving the drill steel collar, said chuck having a transverse enlargement with a cross bore intersecting said collar receiving bore, and a latch bolt in said transverse enlargement's bore, said bolt projecting beyond the limits of said transverse enlargement's bore and having a head on one end, means continuously tending to move said bolt in one direction, said enlargement having a shallow groove and a deep groove intersecting said cross bore, a bolt holding pin projecting from one side of said bolt to lie in either of said grooves to hold said bolt in one position or another, said bolt having a concaved annular groove so located that when said pin is in said deep groove said annular groove will permit the drill steel collar to clear the bolt.

3. In drill retainers, a chuck having a longitudinal hole for the drill steel shank and having a counterbore for receiving the drill steel collar, said chuck having a transverse enlargement with a cross bore intersecting said collar receiving bore, and a latch bolt in said transverse enlargement's bore, said bolt projecting beyond the limits of said transverse enlargement's bore and having a head on one end, means continuously tending to move said bolt in one direction, said enlargement having a shallow groove and a deep groove intersecting said cross bore, a bolt holding pin projecting from one side of said bolt to lie in either of said grooves to hold said bolt in one position or another, said bolt having an annular groove to clear the drill steel collar when said bolt is in one of its said positions, said continuously tending means comprising a coil spring on the bolt between said head and said enlargement.

4. In drill retainers, a chuck having a longitudinal hole for the drill steel shank and having a counter bore for receiving the drill steel collar, said chuck having a transverse enlargement with a cross bore intersecting said collar receiving bore, and a latch bolt in said transverse enlargement's bore, said bolt projecting beyond the limits of said transverse enlargement's bore and having a head on one end, means continuously tending to move said bolt in one direction, said enlargement having a shallow groove and a deep groove intersecting said cross bore, a bolt holding pin projecting from one side of said bolt to lie in either of said grooves to hold said bolt in one position or another, said bolt having a concaved annular groove so located that when said pin is in said deep groove said annular groove will permit the drill steel collar to clear the bolt, said continuously tending means comprising a coil spring on the bolt between said head and said enlargement.

GEORGE W. SMITH.